(12) United States Patent
Muren

(10) Patent No.: US 7,204,453 B2
(45) Date of Patent: Apr. 17, 2007

(54) ROTOR AND AIRCRAFT PASSIVELY STABLE IN HOVER

(75) Inventor: Petter Muren, Nesbru (NO)

(73) Assignee: Proxflyer AS, Nesbru (NO)

( * ) Notice: Subject to any disclaimer, the term of this patent is extended or adjusted under 35 U.S.C. 154(b) by 76 days.

(21) Appl. No.: 10/824,492

(22) Filed: Apr. 15, 2004

(65) Prior Publication Data

US 2004/0245376 A1 Dec. 9, 2004

(30) Foreign Application Priority Data

May 20, 2003 (NO) .................................. 20032282

(51) Int. Cl.
*B64C 27/00* (2006.01)

(52) U.S. Cl. .................................. 244/17.11

(58) Field of Classification Search ............ 244/17.11, 244/17.13, 17.23, 17.25, 23 C, 12.2; 416/34
See application file for complete search history.

(56) References Cited

U.S. PATENT DOCUMENTS

| 2,455,866 | A | | 12/1948 | Kaman |
| 3,213,944 | A | | 10/1965 | Nichols |
| 3,273,824 | A | * | 9/1966 | Owens .................... 244/4 R |
| 3,606,209 | A | * | 9/1971 | Rosta et al. ............... 244/12.2 |
| 4,092,084 | A | | 5/1978 | Barltrop |
| 5,082,079 | A | | 1/1992 | Lissaman et al. |
| 5,255,871 | A | * | 10/1993 | Ikeda ..................... 244/17.13 |
| 5,297,759 | A | | 3/1994 | Tilbor |
| 5,971,320 | A | | 10/1999 | Jermyn |
| 6,086,016 | A | * | 7/2000 | Meek ..................... 244/17.11 |
| 6,182,923 | B1 | | 2/2001 | Weinhart |
| 6,460,802 | B1 | | 10/2002 | Norris |
| 6,659,395 | B2 | | 12/2003 | Rehkemper |
| 6,732,973 | B1 | * | 5/2004 | Rehkemper ............. 244/17.11 |
| 2003/0111575 | A1 | | 6/2003 | Rehkemper |
| 2003/0132341 | A1 | | 7/2003 | Glomstad |

FOREIGN PATENT DOCUMENTS

JP 552 088998 7/1977

\* cited by examiner

*Primary Examiner*—Tien Dinh
(74) *Attorney, Agent, or Firm*—Christian D. Abel

(57) ABSTRACT

The present invention discloses a rotor that enables an aircraft to be passively stable in hover. The rotor, having a generally fixed geometry is tiltably connected to its rotor shaft. The outer part of the rotor blades have a pitch fixed relative to the rotational plane, whereas the inner part of the rotor blades have a pitch fixed relative to a reference plane perpendicular to the rotor shaft.

11 Claims, 6 Drawing Sheets

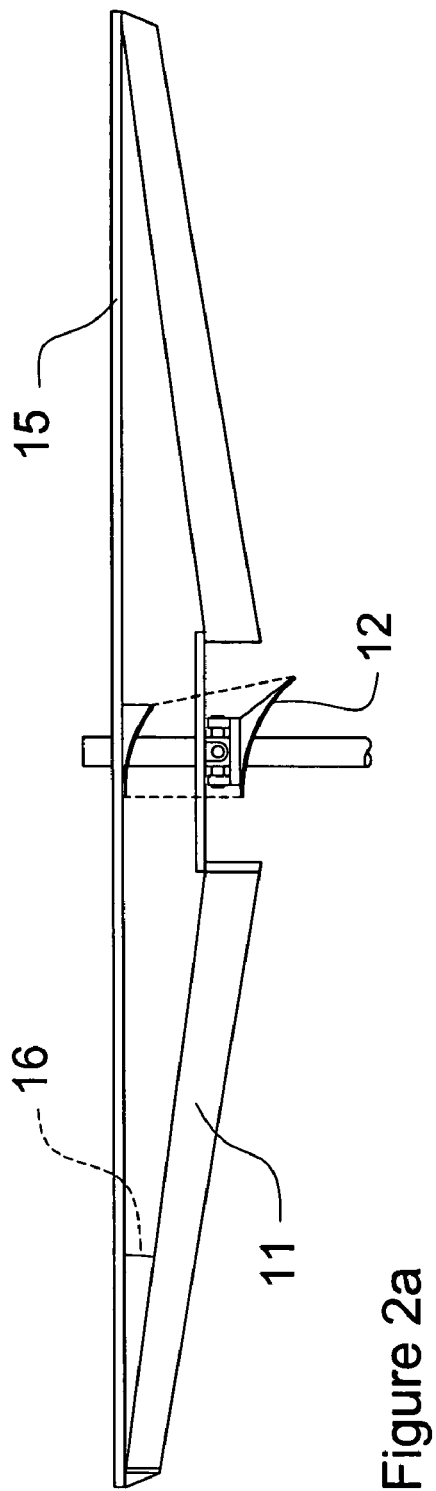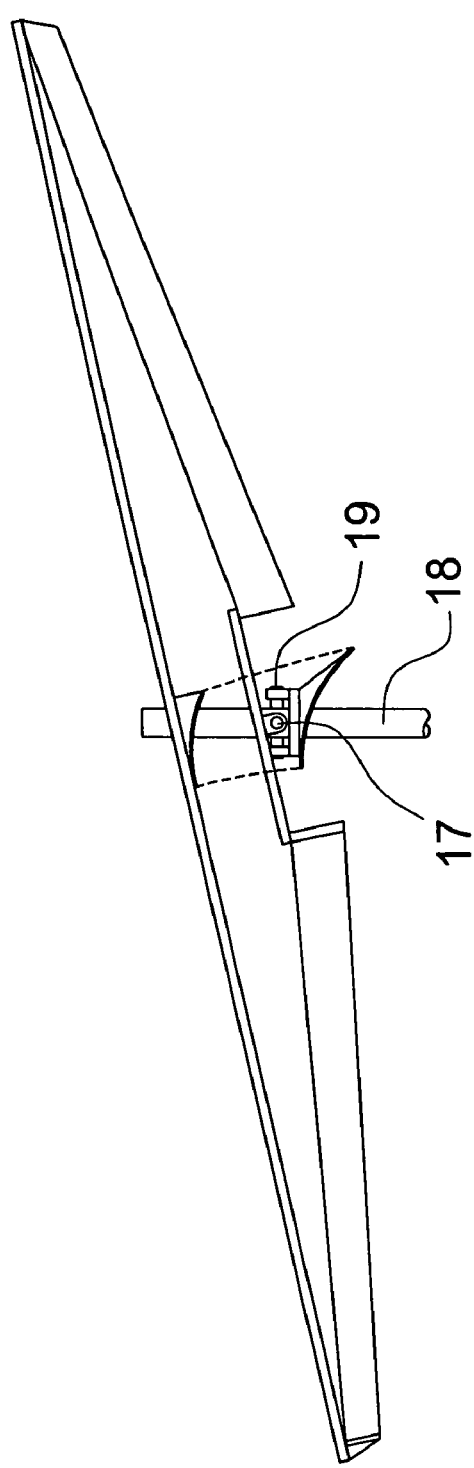
Figure 2a
Figure 2b

ROTOR AND AIRCRAFT PASSIVELY STABLE IN HOVER

FIELD OF THE INVENTION

The present invention relates to rotary wing aircrafts such as helicopters, and in particular to a rotor system that enables passively stable hover. It also relates to a coaxial rotor system specially suited for very small aircrafts and methods to control them.

BACKGROUND OF THE INVENTION

Typically, rotary wing aircrafts like helicopters are sustained by a rotor, rotating about a vertical rotor shaft, generating lift or upward thrust. The direction of thrust is perpendicular to the rotating plane defined by the path the tip of the rotor blades follows when they rotate about the rotor shaft.

In a conventional helicopter the total thrust from the rotor can be changed by collectively changing the pitch angle (or in short; the pitch) of all the rotor blades. The pitch is in the field of propeller aero dynamics defined as the lateral angle between the blades and a reference plane perpendicular to the rotor shaft axis. The angle is measured tangential to the rotation and will therefore not change if the rotor is tilted.

By collectively changing the pitch of the rotor blades the helicopter can be controlled in the vertical direction. The horizontal direction of flight may be altered by cyclically adjusting the pitch of the blades. Cyclically adjusting the pitch, means that the pitch of individual rotor blades are adjusted from a maximum in a particular position of rotation to a minimum at the opposite side. This causes the lift in one part of the rotation to be larger than in other parts, whereby the rotating plane is tilted with respect to the rotor shaft axis. When the rotating plane is tilted like this, the initially vertical thrust also tilts, and therefore gets a horizontal component, pulling the helicopter in the direction of the downwardly tilted rotating plane.

Normally, a helicopter must be actively controlled either by a pilot or from gyroscopic sensors. The necessary means to varying and controlling the pitch angle of each blade is complicated, expensive and add weight to the helicopter.

A fixed pitch rotor without individual blade control would enable a simpler and more light weight helicopter or aircraft. However, a fixed pitch rotor is inherently unstable in hover (remaining stationary in the air) and requires other means of control. There are several examples of helicopters with fixed pitch rotors including fixed pitch counter-rotating rotors, controlled by some kind of weight shifting.

U.S. Pat. No. 6,182,923 discloses a helicopter where the rotor assembly is able to slide in the longitudinal direction of the fuselage, and at the same time it is able to tilt in the transverse direction. The purpose of this arrangement being to alter the center of gravity relative to the thrust from the rotor, thereby tilting the helicopter in the desired direction of flight. Another fixed pitch counter-rotating coaxial rotor helicopter is disclosed in U.S. Pat. No. 6,460,802. In this helicopter the rotor assembly including the engine is pivotally connected to the fuselage and can tilt in any direction, thereby controlling the aircraft.

In several helicopters designed and built by Kaman Corporation, the inner part of the rotor blades have a fixed pitch similar to the rotors above, while they can twist in the longitudinal direction. On the Kaman helicopters the rotor blades are actively controlled by "servo flaps" adapted to twist the blades in order to cyclically change the pitch, thereby controlling the direction of flight.

Control of an aircraft with a fixed pitch rotor can also be achieved by operating vents or slots to alter the flow of air going through the rotor. Another alternative is to use 4 separate propellers, 2 and 2 rotating in opposite direction and placed diagonally about a central vertical axis. Each propeller initially producing an equal part of the vertical thrust needed to lift the aircraft. The aircraft is controlled by tilting it in the desired direction of flight by increasing the thrust from a propeller on one side of the aircraft and reducing the thrust from the propeller on the opposite side. This idea was first realized in a full scale aircraft in 1920. A similar but very small toy aircraft, battery powered and remotely operated, was introduced by Keyence Corporation, Japan in 1997.

The aircrafts described above are examples of simple designs, however, they are not passively stable and therefore need to be controlled by an experienced pilot or operator. Most of them are operated under light wind conditions or indoors.

A rotary wing toy aircraft passively stable in hover is disclosed in U.S. Pat. No. 5,297,759. This aircraft is in fact a large flying rotor with limited possibilities for control.

Another stable toy helicopter is disclosed in U.S. Pat. No. 6,659,395. This patent uses the word propeller or main propeller in stead of rotor, also when it refers to helicopters. Here a helicopter utilizes different kinds of rings or safety arcs attached to the tip of the propeller blades and it relies on gyroscopic forces to change the pitch of the whole propeller to secure stability, much like ordinary 2-blade rotors with large stabilizer bars. The purpose of the safety arcs, apart from making the propeller more safe is described to be: When the main propeller rotates, if the main propeller begins to pitch (tilt about the longitudinal axis of the blades), the safety arcs will begin to move of the horizontal plane. The weight of the safety arcs however, create a gyroscopic effect causing the main propeller to level out by pivoting the blades about a pivot pin with a pivot axis parallel to the blades. This secures that the propeller remains in, or returns to, a horizontal level. In this helicopter, the propeller blades extend outwards from the shaft in a horizontal plane without any coning, and the blades are free to pivot in a way that changes the pitch along the whole propeller without any twisting or bending of the blades.

In the preferred embodiment of this toy helicopter the propeller is actually prevented from flapping (tilting up and down). The purpose of this seems to be to effectively keep the propeller level at all times, thus preventing the helicopter from going into oscillations or becoming unstable. However, this stabilizing system gives limited possibilities for control in the horizontal direction and does not allow for precise maneuvers. This is partly due to the fact that the propeller and the helicopter acts as an common gyroscopic system resisting any attempts to tilt it. It is believed that if a tilting force was applied to the helicopter for a period of time, starting a horizontal movement, it would take a equal and substantively long time to stop the helicopter, making precise maneuvers difficult.

An other problem with a rotor (propeller) like the one described above, having blades not being able to flap, is that if the helicopter actually was tilted by applying an external force, the rotor, due to its inherent weight and gyroscopic effects, would tilt sideways. The sideways tilting could again give rise to new mechanical forces and cause the rotor to tilt in yet another direction. The rotor could then, despite of its stabilizing means, come out of control and the helicopter loose its stability.

In alternative rotor designs disclosed in U.S. Pat. No. 6,659,395 discussed above, circular rings, similar to those used in toy helicopters for decades, are connected to the tip of the rotor blades via pivots or to the rotor center via fly bars. These rotors are functioning more or less along the same principles as described above, trying to maintain a horizontal level at all times. They are believed to have the same limitations as the preferred embodiment.

In many situations and applications it would be desirable to have an aircraft that is stable without any form of active stabilization, even if high forward speed and the ability to operate under windy conditions is sacrificed.

On this background it can be appreciated that there is a need for a rotor that enables this kind of stability. The rotor should also be able to passively keep an aircraft in a fixed position with respect to the surrounding air. Finally, the rotor should allow for full horizontal control and make precise maneuvers possible.

SUMMARY OF THE INVENTION

The present invention aims at fulfilling the needs for a passively stable rotary wing aircraft by disclosing a rotor of simple design, that makes it possible to build such an aircraft. Furthermore, this rotor could be used in a counter-rotating coaxial rotor system that is both light weight, efficient and easy to operate, ideal for small remotely operated electric powered aircrafts.

The rotor disclosed in the present invention has a rotating plane defined by the path that the tip of the rotor blades follows when the rotor rotates and a fixed reference plane being perpendicular to the rotor shaft. The rotor is capable of generating the required lift to enable an aircraft to have sustained stable flight including passively stable hover.

In the preferred embodiment of the present invention the rotor consists of 4 rotor blades arranged in two pairs or sets. The rotor blades are fixed to two center pieces; two rotor blades extending in opposite direction fixed to an upper center piece and the other two rotor blades oriented 90 degrees with respect to the first ones, fixed to a lower center piece. At their tip they are fixed to a ring encircling the whole rotor. The blades are mounted with a predefined pitch and they are inclined upward to compose a rotor with a conical shape. Each orthogonally oriented center piece is independently and hinged connected to the vertical rotor shaft with a hinge axis perpendicular to the longitudinal direction of the rotor blades. The hinged connection enables the torque from the rotor shaft to spin the rotor and at the same time it allows each set of rotor blades to flap (tilt up and down). However, the pitch of the inner part of all the rotor blades remains fixed when the rotor tilts. The ring encircling the entire rotor, per definition, lies in the rotating plane, and because the tips of the rotor blades are fixed to the ring, their pitch angle with respect to the rotating plane is also fixed. This implies that the rotor blades must be flexible and twist about their longitudinal axis when the rotating plane tilts. The present invention rely on three different means functioning together to control the stability and behavior of the rotor.

Firstly the hinged connection between each set of rotor blades and the rotor shaft, together with the flexible blades, enables the rotating plane to tilt more or less freely in any direction with respect to the reference plane.

Secondly, the rotor is stabilized with respect to the rotor shaft, and the aircraft, by allowing one part of the rotor blades to have a fixed pitch relative to the reference plane. If the rotor and the rotating plane has been tilted, the blades will in effect follow a up-and-down path as they rotate, resulting in different lift in different parts of the rotation, whereby the rotor is tilted back to its initial position.

Thirdly, in a rotor that moves horizontally the rotor blades will have different relative airspeed depending on where in the rotation they are. In the part of rotation where the blades rotate forward in the same direction as the movement, the relative airspeed increases. The increased speed gives increased lift, that starts to tilt the rotor or more precisely the rotating plane up in front. When the rotating plane tilts, the vertical thrust also tilts and gets a horizontal component acting against the movement, trying to stop it. The fixed pitch relative to the rotating plane is important because it very much adds to the tilting tendency and it ensures that even small movements with respect to the surrounding air, will tilt the rotating plane.

This increased tilting tendency is actually the opposite of the normally desired behavior of a helicopter rotor and limits the maximum achievable forward speed. When the movement stops, the second means stabilizing the rotor with respect to the rotor shaft, again brings the rotor back to its initial position.

In another embodiment of the present invention the same stabilizing effect is achieved with rotor blades consisting of two parts, flexible or hinged connected to each other. One part of the blade has a pitch angle fixed with respect to the rotor shaft and the other part follows the general movement (and the rotating plane) of the rotor.

The present invention also discloses an aircraft that is passively stable in hover and capable of forward flight, utilizing a coaxial counter-rotating rotor assembly. Horizontal flight is achieved by tilting the whole aircraft by means of weight shifting or by a vertical thrust from a small propeller at the back of the aircraft. Means and methods for controlling the aircraft in yaw (rotation) are also disclosed. Finally, some alternative aircrafts suited for special purposes or operations are mentioned.

BRIEF DESCRIPTION OF THE DRAWINGS

The following detailed description of the preferred embodiment is accompanied by drawings in order to make it more readily understandable. In the drawings:

FIGS. 2a and 2b are side views of the rotor in FIG. 1, showing the rotor in a horizontal and in a tilted position.

DETAILED DESCRIPTION OF THE PREFERRED EMBODIMENT

In the following the present invention will be discussed and the preferred embodiment described by referring to the accompanying drawings. Some alternative embodiments will be described, however, people skilled in the art will realize other applications and modifications within the scope of the invention as defined in the enclosed independent claims.

Figure 1:
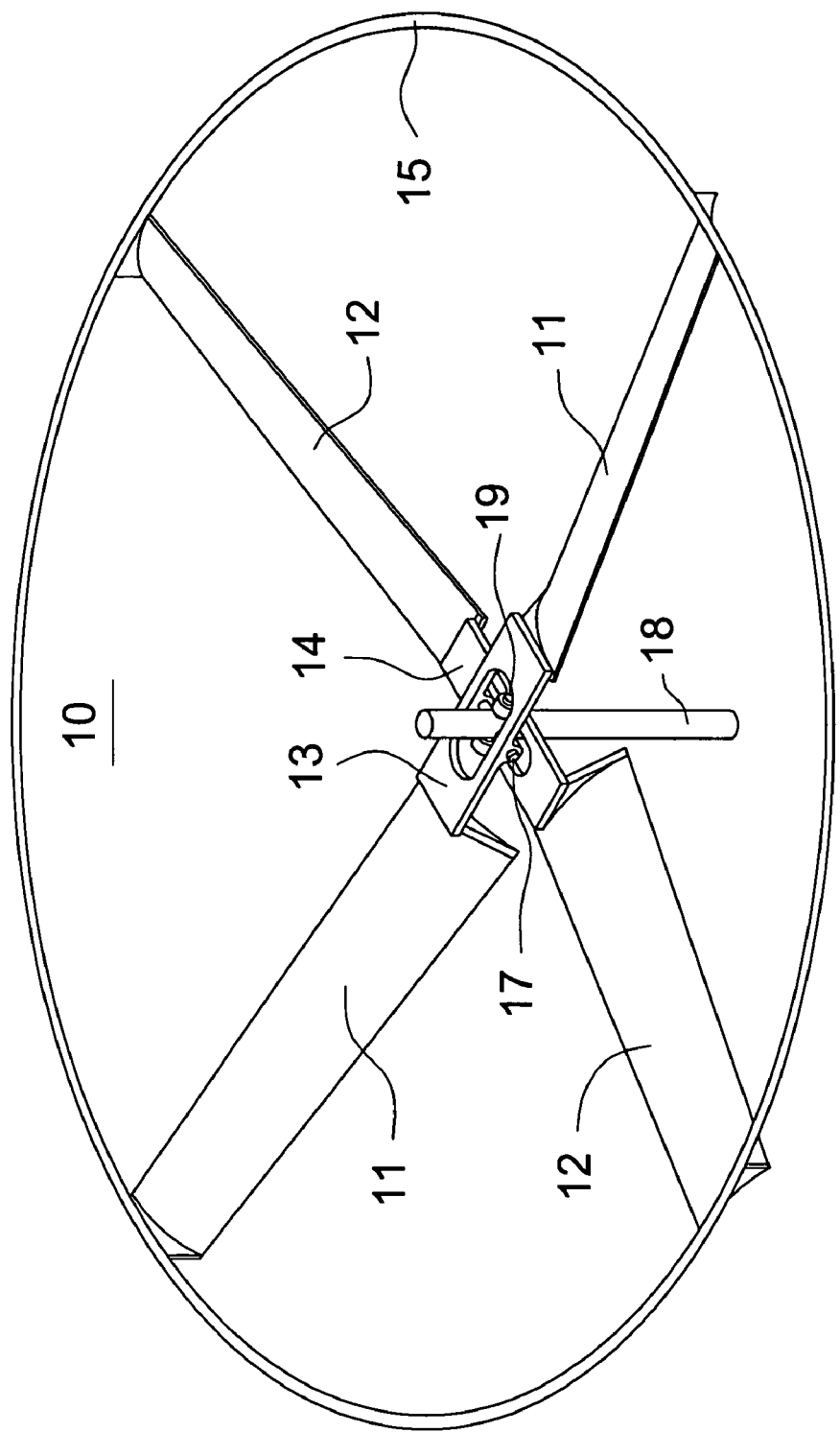
FIG. 1 is a perspective view of a 4-bladed rotor.

In FIGS. 1 and 2 the preferred embodiment of a rotor according to the present invention is shown. It is best suited for small aircrafts, free flying or remotely operated, indoors or under light wind conditions. The rotor has a rotating plane defined by the path that the tip of the rotor blades follows when the rotor rotates and a fixed reference plane being perpendicular to the rotor shaft.

The rotor (10) consists of 4 rotor blades arranged in two pairs or sets with an airfoil having the shape of a thin curved plate. This airfoil is chosen in order to obtain rotor blades that can easily twist and still maintain longitudinal strength. A open cross section like this, is known to have very low torsional stiffness and will allow one end of the blade to rotate or twist with respect to the other end, without the blade bending or breaking.

The rotor blades (11,11,12,12) are fixed to two center pieces; two rotor blades (11,11) extending in opposite direction fixed to a upper center piece (13) and the other two rotor blades (12,12) oriented 90 degrees with respect to the first ones, fixed to a lower center piece (14). At their tip the rotor blades are fixed to a ring (15) encircling the whole rotor. The blades are mounted with a predefined pitch angle of approximately 20 degrees and they are inclined upward 6–12 degrees (16) to compose a rotor with a conical shape.

The orthogonally oriented center pieces (13,14) are independently and hinged connected via pins (17,19) to the vertical rotor shaft (18). The rotor shaft (18) extends trough holes in the initially horizontal positioned center pieces, and the holes are large enough to enable the center pieces to tilt about their hinge axis. The hinge axis are perpendicular to the respective rotor blades (11,12), and the hinged connection enables the torque from the rotor shaft (18) to spin the rotor (10) and at the same time it allow each set of rotor blades to flap (tilt up and down in the longitudinal direction).

Figure 5A:
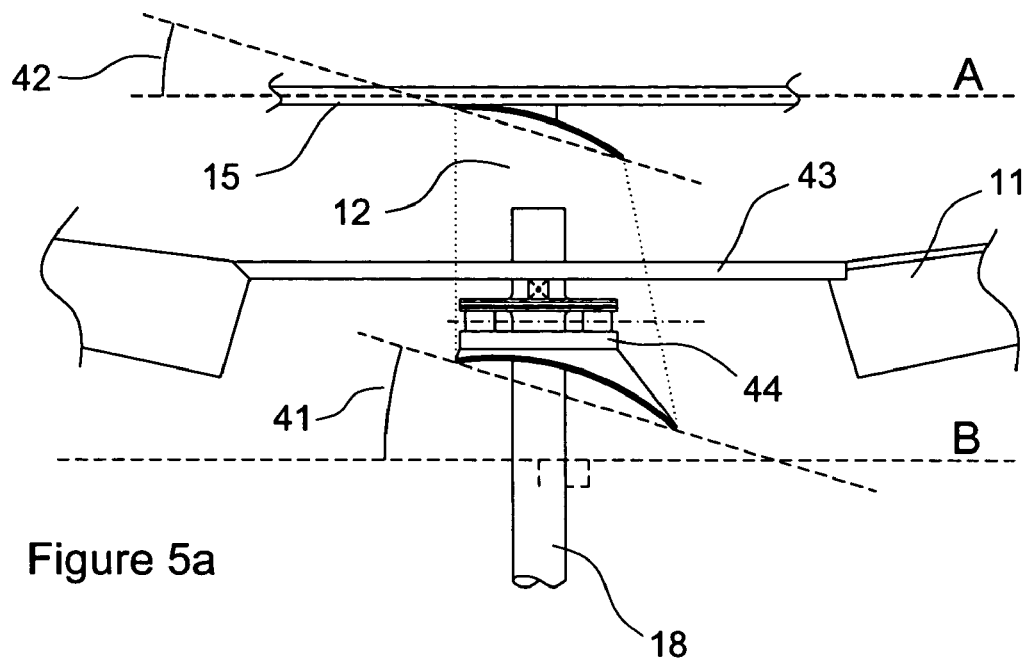
FIGS. 5a and 5b are side views of a 4-bladed rotor in a horizontal and in a tilted position.
Figure 5B:
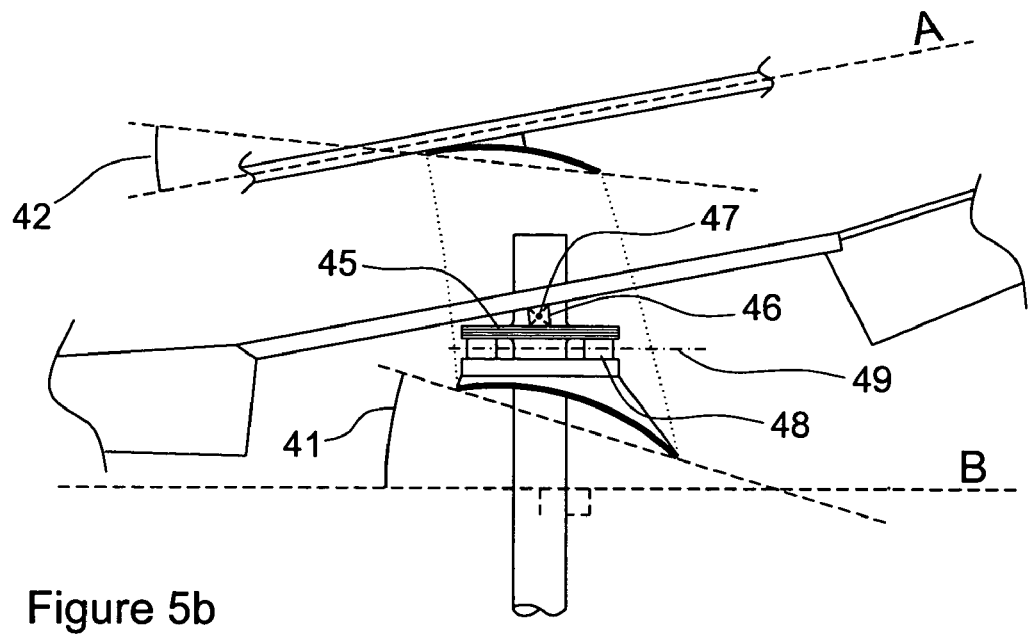

With reference to FIG. 5, details regarding the hinges, the hinge axis and the fixed pitch are explained. FIG. 5a shows the rotor in its initial position while FIG. 5b shows the rotor in a tilted position. The tiltable rotating plane is marked (A) and the fixed reference plane is marked (B).

Figure 3A:
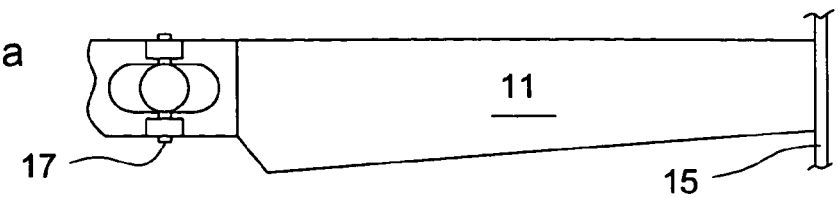
FIG. 3a is bottom view, 3b is rear view and 3c is side view of a rotor blade that can twist along its longitudinal axis.
Figure 3C:
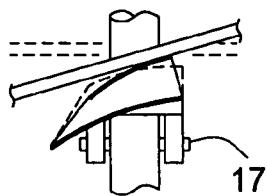
Figure 3B:
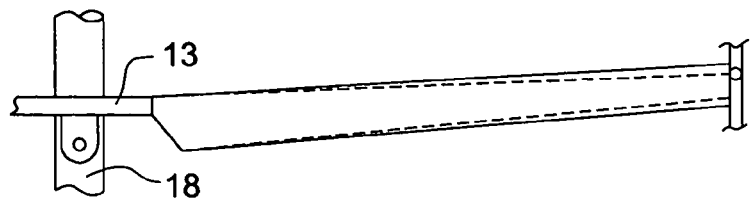
Figure 4A:
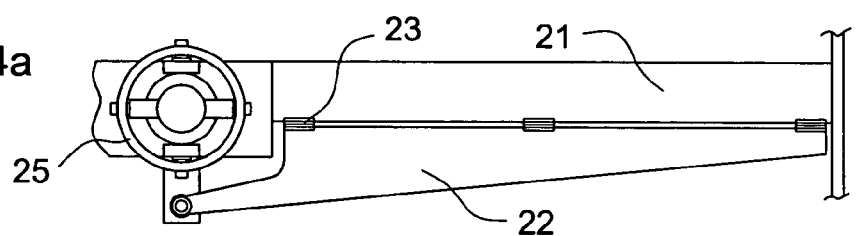
FIG. 4a is bottom view, 4b is rear view and 4c and 4d is side views of a rotor blade comprised of two connected elements.
Figure 4C:
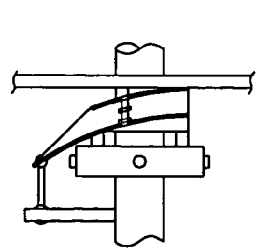
Figure 4B:
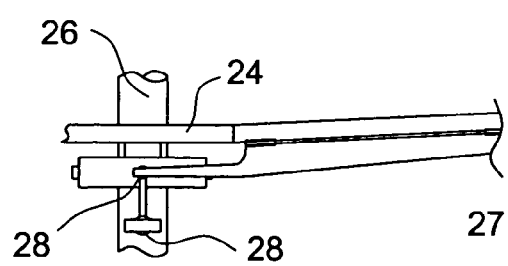
Figure 4D:
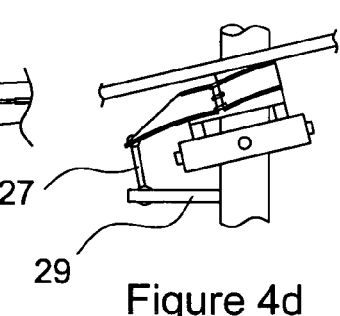

The hinges (46,48) may be any kind of hinge, either consisting of pivoting pins (17,19) as in FIGS. 1, 2 and 3 or i.e. some kind of flexible material. The orientation of the hinge axis (47,49), perpendicular to each respective set of rotor blades, is essential, but apart from that, the hinges (46,48) may be any kind of hinge. The internal friction or stiffness of the hinge should, however, be as small as possible to not introduce unwanted mechanical forces between the rotor (10) and the rotor shaft (18). In order for the rotor to be able to tilt freely, it is also important that the vertical position of the hinge axis (47,49) is more or less in line with the rotor blades (11,12). If the hinge axis (47,49) are placed below the rotor, the fixed conical shape of the rotor will restrict the free tilting because the rotor blades (11,12) can only twist and not bend.

Both hinges (46,48) are connected to the rotor shaft via a hub (45). The hub (45) may hold either a set of flexible hinges or a set of pivoting pins, depending on what kind of hinges that are being used.

The first hinge axis (47) associated with the first set of rotor blades (11) and the second hinge axis (49) associated with the second set of rotor blades (12), are orientated perpendicular to each other. Therefore, at any given point in the rotation, one set of blades will be able to tilt (the tip moving up or down) in a first direction, and because all the tips are fixed to a ring (15), the other set of blades will have to twist in order to accommodate this tilting. In FIG. 5b the first set of rotor blades (11) is tilted, while the second set (12) is twisted. However, the second set of rotor blades (12) is still free to tilt while the blades are twisted, and the first set of blades (11) will then have to twist in order to accommodate this second tilting. Because each set of rotor blades is able to tilt independently and because all the rotor blades are able to twist, this in combination, enables the rotor (10) and the rotating plane (A) to tilt in any direction with respect to the reference plane (B). Any tilted orientation of the rotating plane (A) will thus comprise a combination of tilted and twisted blades, including blades that are both tilted and twisted at the same time.

Since the blades are forced to twist in order to accommodate tilted orientations of the rotating plane (A), the pitch (41) of the inner part of a blade and the pitch (42) of the outer part of the blade will vary with respect to each other during the rotation. The pitch (41) of the inner part of the blade will remain unchanged with respect to reference plane (B), while the pitch (42) of the tip will remain unchanged with respect to the now-tilted, rotating plane (A). When the rotating plane (A) is tilted like this, each rotor blade (11,12) will actually go trough a cycle of tilting and twisting as the rotor spins (tilted up, twisted counter-clock-wise, tilted down, twisted clock-wise).

The present invention relies on three different means controlling the stability and the behavior of the rotor. The rotor (10) described above obtains its passive stability from combining all of these means in the same rotor.

Firstly; the rotating plane (A) is tiltable in any direction with respect to the reference plane (B).

Secondly; a part of the rotor blades (11,12) have a pitch angle (41) generally fixed relative to the reference plane (B).

Thirdly; a part of the rotor blades (11,12) have a pitch angle (42) generally fixed relative to the rotating plane (A).

How and why this enables a rotor to be passively stable will now be explained in more detail:

Firstly; the rotating plane (A) is tiltable in any direction with respect to the reference plane (B):

A rotor (10) as described above, is, because of the weight of the rotor blades (11,12) and the ring (15), influenced by gyroscopic forces. Due to the effect of gyroscopic precession, a rotating object like this rotor will when it is subject to a tilting force, tilt in a transverse direction. If the rotor (10) had been more rigidly connected to the rotor shaft (18) and aerodynamic forces tried to tilt it relative to the shaft, it would experience mechanical forces from the connection, trying to hold it back. Because of the gyroscopic precession, the rotor would actually start to tilt sideways with respect to the initial force holding it back. The sideways tilting would again give rise to new mechanical forces and cause the rotor to tilt in yet another direction. The rotor could easily come out of control.

From the discussion of gyroscopic forces, it can be seen that because the rotor (10) of the present invention has a generally fixed geometry, one of the important and necessary features is that it can tilt more or less freely in any direction with respect to the reference plane (B). This is of course to reduce any mechanically introduced forces between the rotor (10) and the rotor shaft (18) and to prevent any oscillations.

Secondly; a part of the rotor blades (11,12) have a pitch angle (41) generally fixed relative to the reference plane (B):

Since the rotor can tilt in any direction it is essential to stabilize it. The rotor (10) is stabilized with respect to the rotor shaft (18). Because the rotor is stabilized with respect to the rotor shaft (18) it will be possible to precisely control the rotor (10) by tilting the rotor shaft (18) or the aircraft employing such a rotor. The control of the aircraft will be described in more detail later.

The stability with respect to the rotor shaft (18) is explained assuming that the rotor (10) is not moving. However, the stabilizing effect is the same in a moving rotor. In a moving rotor other effects described below also acts on the rotor blades.

If the rotor (10) has been tilted, the inner part, the part of the blades with more or less fixed pitch (41) relative to the reference plane (B) will have reduced lift when they rotate towards the point where the rotating plane is at its highest and accordingly increased lift on the opposite side. This is because the blades can be seen as moving up and down with respect to the reference plane (B) as they rotate along the tilted path, thus in effect changing the incident angle and therefore also the lift. The highest upward speed, and therefore also the lowest lift, occurs when the blades are 90 degrees of rotation in front of the highest point. The highest lift occurs on the opposite side, 90 degrees of rotation in front of the lowest point.

Because of the gyroscopic precession described above the rotor (10) is tilted back to its initial position by the differences in lift, and not sideways that one could otherwise be led to believe.

Thirdly; a part of the rotor blades (11,12) have a pitch angle (42) generally fixed relative to the rotating plane (A):

To achieve passive stability in hover, the rotor (10) acts against any movements relative to the air surrounding it. In a rotor that moves horizontally, the rotor blades will have different relative airspeed along the rotation. In the part of rotation where the blades rotate forward in the same direction as the movement (the advancing blade), the relative airspeed is higher than on the opposite side (the retreating blade). It is obvious that the highest relative speed, and therefore also the highest lift, occurs at the point where the advancing blades are pointing out to the side, perpendicular to the forward movement. The increased lift starts to tilt the rotating plane (A). Because of the gyroscopic precession, the increased lift on the advancing blades causes the rotating plane (A) to tilt up in front of the movement, and not sideways.

An important and essential feature of the rotor (10) is that this tendency to tilt up in front as a response to a horizontal movement, is further increased. This is achieved by letting the rotor blades be able to twist in order for the outer part of the rotor blades (11,12) to have a pitch angle (42) generally fixed relative to the rotating plane (A). If the rotor (10) is tilted up in front, the rotor blades pointing out to the sides will have a unchanged pitch (41) in the inner part, whereas the pitch further out along the blades will follow the twisting of the blades, until, at the tip, they have the original pitch (42) relative to the now tilted rotating plane (A). Compared to a conventional fixed pitch rotor, this enables the rotor (10) of the present invention to further increase the lift on the advancing blades and to further reduce the lift on the retreating blades, thus increasing the amount of tilting.

Initially the rotor (10) has a thrust, pointing directly upward. When the rotating plane (A) starts to tilt, the thrust also tilts and thereby gets a horizontal component acting against the movement, trying to stop it. The coning (16) of the rotor (10) also contributes to the tilting tendency by increasing the lift on the rotor blades (11,12) when they are in the front part of the rotation. The rotor (10) actually starts to tilt at very small horizontal speeds and in effect holds the rotor at a fixed position relative to the surrounding air as long as the rotor shaft (18) is kept vertical.

The increased ability to tilt in response to any horizontal movement, distinguishes this rotor (10) from other rotors. It is actually the opposite of normally desired behavior of a helicopter rotor. No other presently known rotors seems to tilt and act against movements relative to the surrounding air in the same way as the rotor (10) of the present invention does.

When the rotor (10) moves horizontally, the second means stabilizing it with respect to the rotor shaft (18) is still active, trying to bring the rotating plane (A) in line with the reference plane (B). However, the increased tilting tendency is the dominant factor and it will limit the maximum achievable forward speed. When the movement slows down, the stability of the rotor (10) with respect to the rotor shaft (18), gradually brings the rotor and the rotating plane (A) back to a horizontal level, parallel with the reference plane (B).

In the rotor (10) shown in FIG. 1, the relative importance of the stability with respect to the rotor shaft (18) compared to the ability to tilt up in response to a horizontal movement are influenced by; the rotating speed of the rotor, the degree of coning, weight, shape and stiffness of the rotor blades (11,12) and on the ring (15) encircling them, as well as the general geometry and weight of an aircraft employing the rotor. These factors will have to be optimized with respect to each other in order to obtain passive stability in hover.

Experience has shown that: Low rotational speed requires rotor blades that are generally wider, and 50–80% wider at the root than at the tip. Low rotational speed also requires more tip-heavy rotor blades or a ring encircling them. High stability with respect to the surrounding air requires more coning and rotor blades that twist easily in the longitudinal direction. It can also be seen, that if the ability to tilt up in response to a horizontal movement is given too much priority, it will be difficult to enter into forward flight or to handle windy conditions. In such a case it will be necessary to alter some parts of the design or the operating parameters in order to maintain the desired behavior.

The ring (15) encircling the rotor blades (11,12) has three different purposes: Firstly, it supports the rotor blades so that the pitch (42) of the outer part of the rotor blades (11,12) are fixed relative to the rotating plane (A) of the rotor (10). The ring by definition lies in the rotating plane.

Secondly, it protects the rotor (10) during operation by preventing anything from coming into or between the rotor blades (11,12). Thirdly, the ring (15) utilizing its inherent weight, secure good gyroscopic stability of the rotor (10) even at low rotational speed.

However, despite the different purposes of the ring (15), it is important to notice that the use of such a ring does not in any way limit the present invention. It is possible to design a rotor with rotor blades according to at least one of the claims in the present invention that would function without a ring encircling it.

With reference to FIG. 4, a different embodiment of a rotor blade is shown. The rotor blade is comprised of two elements: A first element (21) with a fixed pitch relative to the rest of the rotor (will be described below) and a second element (22) with flexible or hinged connection (23) to the first element. The purpose of the connection is to line up the second element (22) with the first element (21), and at the same time enable the two elements (21,22) to alter their pitch angle with respect to each other. The connection should have as little friction or stiffness as possible.

The first element (21) is fixed to a single center piece, a hub (24). The hub (24) holds all of the rotor blades in the rotor. Initially the rotor can be viewed as a fixed shape rotor with the first elements (21) being rotor blades extending out from the hub (24), inclined slightly upwards. At the trailing edge of the first element (21), the second element (22) is connected. The second element (22) has the same length as the first one (21). The hub (24) is connected by gimbals (25) to the rotor shaft (26), thus allowing the rotor to tilt in any direction (the rotating plane can tilt in any direction with respect to the reference plane). The second element (22) has a more or less fixed pitch relative to the reference plane and the rotor shaft (26). This is achieved by connecting the inner, aft end of the second element (22) by small gimbals (28) to a link (27). The link (27) is being parallel to the rotor shaft (26) and is extending downwards from the rotor blade, placed at a horizontal distance behind the hinge axis between the two elements (21,22). At the lower end, the link (27) is again connected by small gimbals (28) to a bar (29) extending horizontally out from the rotor shaft (26).

The upper small gimbals (28), connecting the upper part of the link (27) and the second element (22) of the rotor blade, is placed on an axis going trough the rotor shaft (26), being perpendicular both to the longitudinal axis of the rotor blade (21,22) and to the axis of the rotor shaft (26). This enables the rotor blade to tilt up and down without any relative movement of the second element (22). If however, the rotor tilts in the other direction (the direction, that in case of the first embodiment discussed above, would have twisted the rotor blade) the first element (21) tilts together with the rest of the rotor while the second element (22) at its aft end is prevented from moving up or down, and therefore, instead keeps the pitch relative to the reference plane and the rotor shaft (26) generally unchanged. The shape of the airfoil consisting of the two elements (21,22) is actually changed as a result of this tilting.

When examining the rotor blade in FIG. 4 and following the discussion above it can be appreciated that a rotor comprised of these rotor blades will function along the same principles as the first embodiment shown in FIG. 3, thereby enabling sustained flight, passively stable in hover. It can also be appreciated that this rotor will function regardless of the presence of a ring encircling it. Another important feature of this rotor blade is that it functions just as well for 2, 3, 4 and 5 bladed rotors. People skilled in the art will also realize modifications and variations of this embodiment within the scope of the invention.

The present invention also discloses different aircrafts having coaxial, counter-rotating rotors. They are passively stable in hover and capable of forward flight at low speeds. Stable hover makes the aircrafts much more simple to operate and control. The coaxial counter-rotating rotors in addition to being very power effective also have the advantage that any gyroscopic or aerodynamic effects tends to balance each other out, adding to the simplification of control. The fixed geometry of the tiltable rotors also reduces the need for individual flapping or lead/lag (forward and aft) movements of the rotor blades and still there are little or no vibrations in the aircraft.

Figure 6:
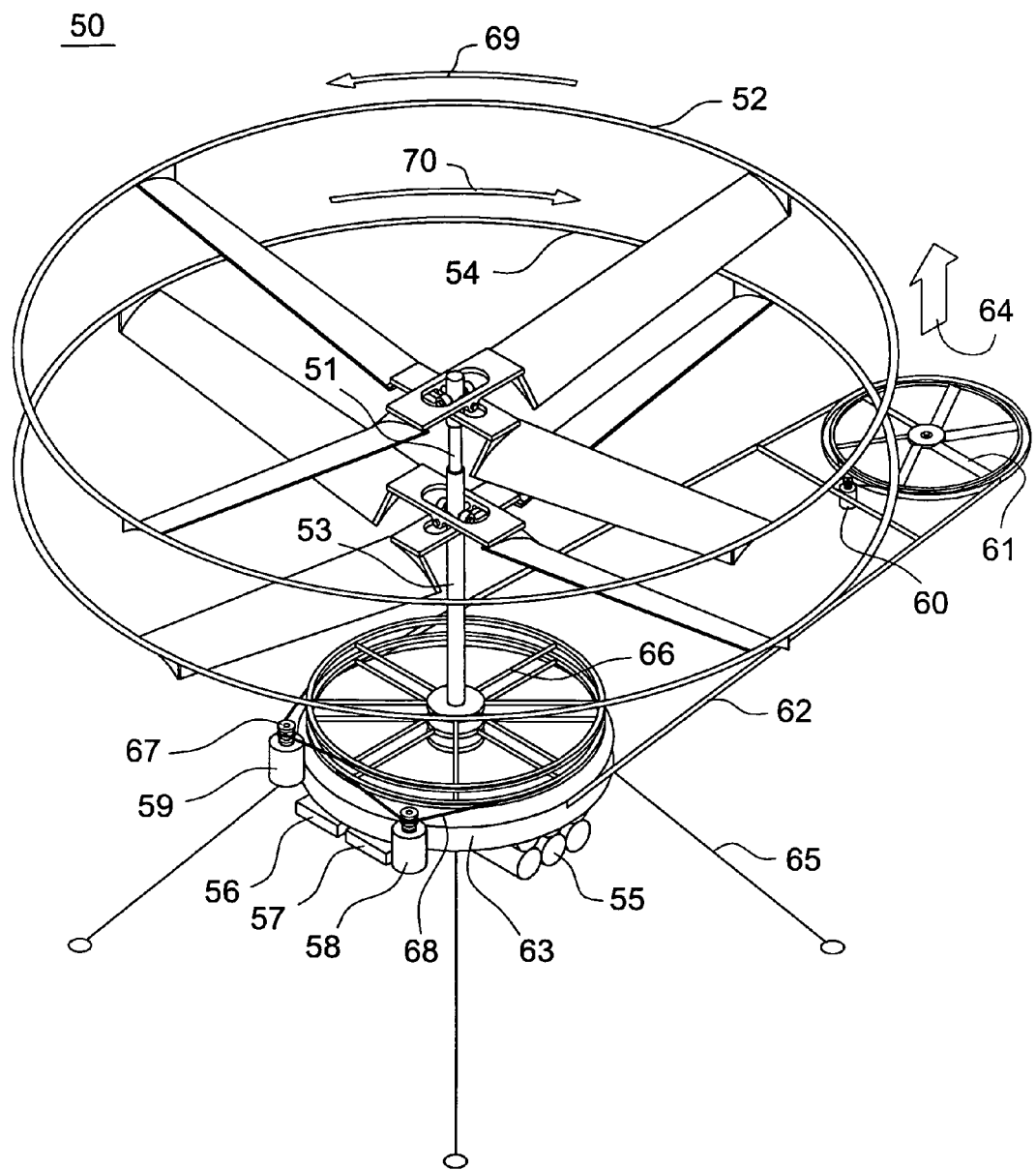
FIG. 6 is a perspective view of an aircraft with a coaxial rotor assembly and a vertical thrust propeller for control.

With reference to FIG. 6 the preferred embodiment of an aircraft (50) according to the present invention, is shown. It is a small electric powered remotely operated helicopter-like aircraft (50) having a coaxial, counter-rotating rotor. The coaxial rotor assembly consists of two rotors (52,54) similar to the one disclosed in the first embodiment discussed above. The two rotors are placed one above the other utilizing an inner shaft (51) for the upper rotor (52) and an outer shaft (53) for the lower rotor (54). The main advantage of this rotor assembly is that it does not need any counteracting of the rotor torque by i.e. a tail rotor. The two rotors, rotating in opposite directions (69,70) balances each other out, hence, all the power is directed to producing lift. Because the aircraft is carrying its own substantially heavy batteries (55), it is important that the rotor assembly is very efficient and that the entire aircraft is light weight, preferably built of carbon fiber laminates or similar light weight materials.

The aircraft (50) is remotely controlled by an operator using a transmitter with control sticks (not shown) to send control signals to a receiver (56) in the aircraft. The control signals in turn controls electric speed regulators (57) electrically connected to two electric motors (58) and (59) for driving the main rotor assembly and one small electric motor (60) for driving a thrust propeller (61), adopted for tilting the aircraft. All the electronics and the motors are commercially available and considered to be prior art. The two main motors (58,59) are placed side by side in the front of the aircraft (50). The small thrust propeller (61) for control, is placed between two rods (62) extending horizontally aft from the main body (63) of the aircraft (50). It is orientated horizontally in order to give a vertical thrust vector (64) that could act to tilt the whole aircraft, including the rotor shaft and the rotors. The aircraft (50) is supported by 4 flexible legs (65) extending downwards from the main body (63), while on the ground.

The main electric motors (58,59) are connected to the rotor shafts (51,53) via reductions, comprised of large diameter wheels (66) on the rotor shafts and small wheels (67) on the motor shafts, the small wheels driving the large ones via rubber bands (68) of sufficient strength. The two large wheels (66) is positioned close together, with the upper wheel connected to the outer shaft (53) and the lower wheel connected to the inner shaft (51). The two motors (58,59) driving the main rotors, run in opposite directions but have the same amount of torque output. When the speed of the motors, and subsequently the speed of the rotors are increased the thrust will eventually lift the aircraft.

Control of this aircraft is very easy:

Vertically, the aircraft (50) is controlled by the speed (69) and (70) of the two main rotors. To climb the speed is increased, thereby the thrust from the rotor assembly increases. To descend, the speed is reduced. Because the torque driving the rotors in opposite direction is balanced and because the aircraft is passively stable, no other control inputs are required.

Yaw control, turning the aircraft (50) from side to side, is achieved by simply increasing the speed (69) of one rotor and reducing the speed (70) of the other rotor by the same amount. The aircraft (50) will then turn in a direction opposite to that of the rotor which has got the increased speed.

Horizontally, the aircraft (50) is only controlled in forward and aft direction. To enter into forward flight the speed of the small thrust propeller (61) positioned at the back of the aircraft (50) is increased. The vertical thrust (64) from this propeller acts to tilt the whole aircraft, including the rotor shaft and the main rotor assembly. Because the rotors can tilt more or less freely it is also easy to tilt the aircraft with respect to the rotors. The stability of the rotors with respect to the shaft ensures that the rotors tilt together with the aircraft (50) and thereby giving the total thrust from the main rotors a horizontal component that propels the aircraft (50) forward. The same but opposite action will propel the aircraft (50) in a backwards direction. If the small thrust propeller is actually it selves a small stable rotor according to the present invention, the aircraft could also be passively stable in yaw. That is, if the aircraft starts to rotate, the small rotor at the back will tilt and the initial vertical thrust from it will get a horizontal component that acts against the rotation.

Because of the rotors inherent resistance against horizontal movements, it is a limitation to the maximum achievable speed. It can also be seen that in order to direct the aircraft (50) sideways, it is necessary to first turn the aircraft, and then enter into forward flight in the desired direction.

All in all, these three directions of control; vertical, forward/aft and yaw (heading) adds up to be a very easy and intuitive way of operating the aircraft (50). And possibly the most important feature of this aircraft being: If the operator at any time during the flight looses control of the aircraft, he can just release the controls sticks back to neutral position, and the aircraft (50) will stop and go into stable hover by itself!

Figure 7:
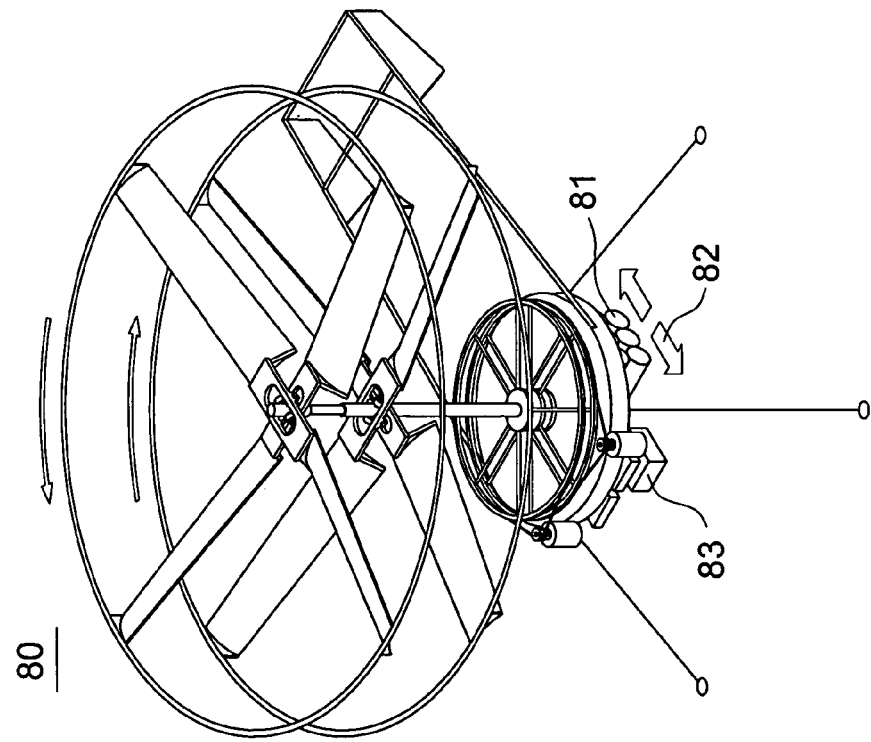
FIG. 7 is a perspective view of an aircraft employing an alternative embodiment of the present invention.

Other embodiments of the invention can also be realized. With reference to FIG. 7 an alternative aircraft (80) can be seen. It is very similar to the previous one, and only the differences will be discussed. In stead of having a small thrust propeller positioned out to the aft of the aircraft, the aircraft can be tilted by means of weight shifting. A separate and substantial heavy part of the aircraft, in this case its batteries (81), can be controllably moved in a horizontal direction (82) by a servo actuator (83) electrically connected to the receiver. The movement of the batteries (81) alters the center of gravity with respect to the rotor assembly, thereby tilting the aircraft (80) and rotor assembly, to initiate and sustain horizontal flight. This aircraft is still very simple, but requires a few more electro-mechanical parts than in the case of the preferred embodiment using a thrust propeller. The principles for operating the aircraft are otherwise identical to those described above.

Figure 8:
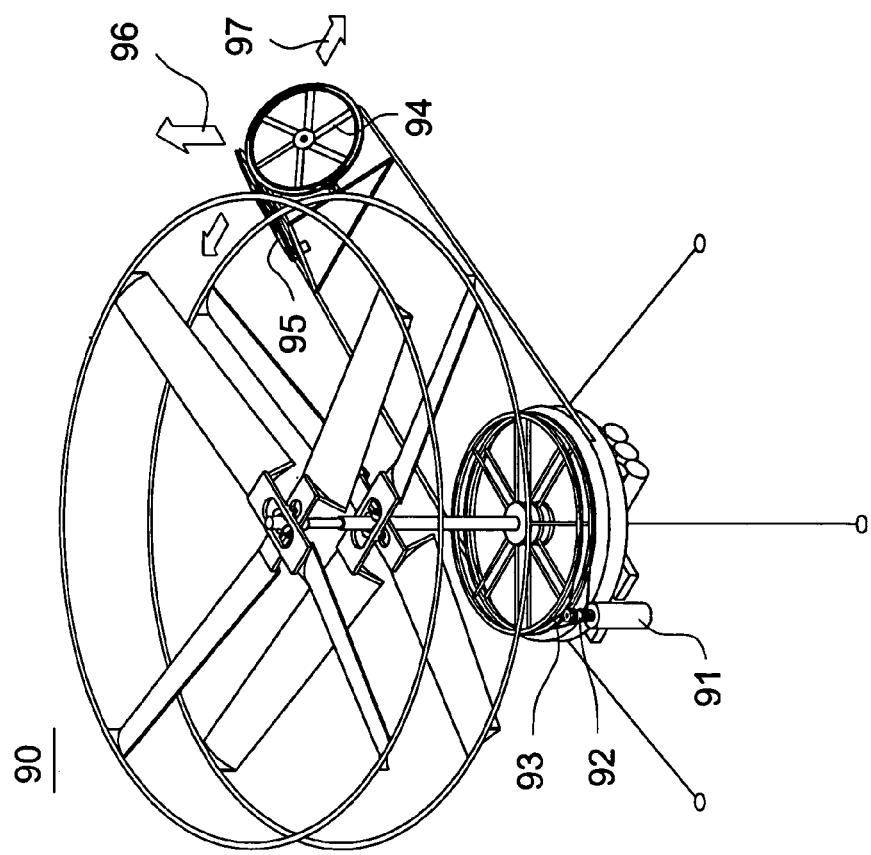
FIG. 8 is a perspective view of an aircraft employing an other alternative embodiment of the present invention.

Yet another embodiment of the present invention is shown in FIG. 8. This alternative aircraft (90) is also quite similar to the previous ones, however now both the main rotors are driven from one larger electric motor (91) with a small double-wheel (92). One of the two driving rubber bands is twisted (93) in order to get the rotors to rotate in opposite directions. Because both rotors now always rotates at the same speed, yaw control is being provided by other means. At the back of the aircraft (90) the single thrust propeller is replaced by two propellers (94) and (95) orientated orthogonally in order to provide both a vertical (96) and a horizontal (97) thrust. The vertical component is adopted to tilt the aircraft (90) in the same way as described above, and the horizontal component is adopted to provide yaw control.

Other modifications to the embodiments could be imagined. All the described aircrafts, in addition to forward flight could achieved sideways flight by utilizing means for also tilting the aircrafts sideways. Further, means for generating thrust can be small propellers, jets or any other arrangements capable of generating thrust. To obtain horizontal flight the thrust generating means can be placed close to the rotor assembly, producing a horizontal thrust vector that propels the aircraft in the desired direction. In an other embodiment, four rotors could be used in stead of propellers in an aircraft like the one from Keyence Corporation described earlier, also providing passive stable yaw. The rotor of the present invention could be realized in combination with active cyclic pitch control in a conventional helicopter, and if needed, the helicopter could enter into passively stable hover or some kind of stable fail-safe modus.

Even if the features of the present invention are described in connection with aircrafts and helicopters, the invention would be useful in many other applications. In fact, the present invention may advantageously be utilized in all applications wherein items should remain stable in hover without requiring any active control, neither electronic nor manual. Examples of such applications could be: Advertisements purposes where the aircraft carries i.e. stickers, banners, flags, logos or display screens. Inspections of any kind where the aircraft being equipped with a set of sensors including a video camera. Film or television production, carrying microphones or cameras. Gathering any kind of environmental or metrology data using an aircraft equipped with a set of sensors, just passively drifting with the wind. Any kind of flying toy, either remotely controlled or free flying. In larger scale, different kinds of lifting operations, or police and military operations.

While the preferred embodiment of the present invention have been described and certain alternatives suggested, it will be recognized by people skilled in the art that other changes may be made to the embodiments of the invention without departing from the broad, inventive concepts thereof. It should be understood, therefore, that the invention is not limited to the particular embodiments disclosed but covers any modifications which are within the scope and spirit of the invention as defined in the enclosed independent claims.

The invention claimed is:

1. A rotor, generating lift, comprising at least two rotor blades and a generally vertical rotor shaft having a central axis, each rotor blade extending outwards from the rotor shaft, ending in a tip, the rotor having a rotating plane defined by a path that each tip of the rotor blades follows when the rotor rotates, wherein the rotating plane is tiltable in any direction with respect to a reference plane perpendicular to the rotor shaft axis, at least a part of one or more of the rotor blades has a pitch angle generally fixed relative to said reference plane, at least a part of one or more of the rotor blades has a pitch angle generally fixed relative to the rotating plane.

2. A rotor according to claim 1, wherein the part of the rotor blades having a pitch angle generally fixed relative to the rotating plane is the part of the blade in the region of the tip, and wherein the part of the blades having a pitch angle generally fixed relative to said reference plane is the inner part of the blade.

3. A rotor according to claim 2, wherein at least one of the rotor blades are made of a flexible material enabling said rotor blade to twist in a longitudinal direction.

4. A rotor according to claim 3, wherein a first set of rotor blades are connected to the rotor shaft by a first flexible or pivoting hinge with a hinge axis generally perpendicular to both the rotor blades and the rotor shaft, and a second set of rotor blades arranged perpendicular to the first set and connected to the rotor shaft by a second flexible or pivoting hinge with a hinge axis generally perpendicular to both the second set of rotor blades and the rotor shaft, and where at least the inner part of all the rotor blades have a pitch angle that remains fixed relative to said reference plane when the rotor is tilted up and down or sideways, and wherein the rotor blades at their tip are connected to a ring encircling the rotor.

5. A rotor according to claim 4, wherein the rotor blades are inclined upward with respect to said reference plane, giving the rotor a conical geometry.

6. A rotor according to claim 1, wherein at least one of the rotor blades is comprised of two or more elements, flexible or hinged connected to each other and where at least one element of said rotor blade having a pitch angle generally fixed relative to said reference plane and at least one other element of said rotor blade having a pitch angle generally fixed relative to the rotating plane.

7. An aircraft passively stable in hover, said aircraft comprising at least one rotor according to claim 1, 2, 3, 4, 5, or 6.

8. An aircraft according to claim 7 further comprising a means adapted to enable controlled tilting of the aircraft.

9. The aircraft according to claim 8 wherein the means for tilting the aircraft is a means for generating a controllable vertical thrust vector connected to said aircraft at a horizontal distance from said rotor.

10. The aircraft according to claim 8, comprising two rotors, placed one above the other, said two rotors rotating in opposite directions, creating a coaxial, counter-rotating rotor assembly, wherein the rotational speed of said two rotors can be controllably changed relative to each other, to provide yaw control.

11. An aircraft according to claim 7, wherein the aircraft is a passively stable flying toy, either as a remotely controlled toy helicopter or as any other kind of hovering toy aircraft.

* * * * *